Nov. 8, 1955            T. C. KNUDSEN           2,723,138
FASTENING MEANS FOR ATTACHING A PULLEY
OR THE LIKE TO A SHAFT
Filed March 13, 1952

Inventor
Thomas C. Knudsen
by Wayne B. Easton
Attorney

United States Patent Office 2,723,138
Patented Nov. 8, 1955

2,723,138

FASTENING MEANS FOR ATTACHING A PULLEY OR THE LIKE TO A SHAFT

Thomas C. Knudsen, Wauwatosa, Wis., assignor to Allis-Chalmers Manufacturing Company, Milwaukee, Wis.

Application March 13, 1952, Serial No. 276,408

3 Claims. (Cl. 287—52.06)

The present invention relates to an improved fastening device for securing mechanical members such as pulleys, gears, sprockets, drives, couplings, etc., to shafts or the like.

Fastening devices employing a shaft engaging bushing with a tapered external surface which cooperates with a tapered internal surface of a longitudinally split sleeve member for the purpose of clamping the sleeve member to another mechanical element, have long been known in the prior art. The clamping action of these devices involve forcibly moving the split sleeve member axially relative to the bushing. Such devices are found in shaft and pipe couplings and in power transmitting connections for securing pulleys, gears, etc., in driving and driven relationship to shafts.

The type of fastening device referred to has previously been utilized for clamping adjustable pitch, multiple groove pulleys to shafts. In constructions of this kind relatively movable, annularly shaped disks are mounted on a longitudinal sleeve member which in fact is a functional element of the fastening device. It is desirable that the adjustable pitch pulley should have a wide range of pitch diameters and the outside diameter of the sleeve member is a factor which determines the lower limit of the range, i. e., the smallest pitch diameter which can be obtained.

A primary object of the invention, therefore, is to provide a new and improved fastening device of the type referred to in which the sleeve member for receiving the disk elements of an adjustable pitch pulley has a relatively small outside diameter.

Another object of the invention is to provide new and improved means for forcibly moving the respectively tapered members of a fastening device axially relative to one another.

Another object is to provide a new and improved clamping device which is inexpensive to manufacture and maintain and which is compact and economical of space.

Figure 1:
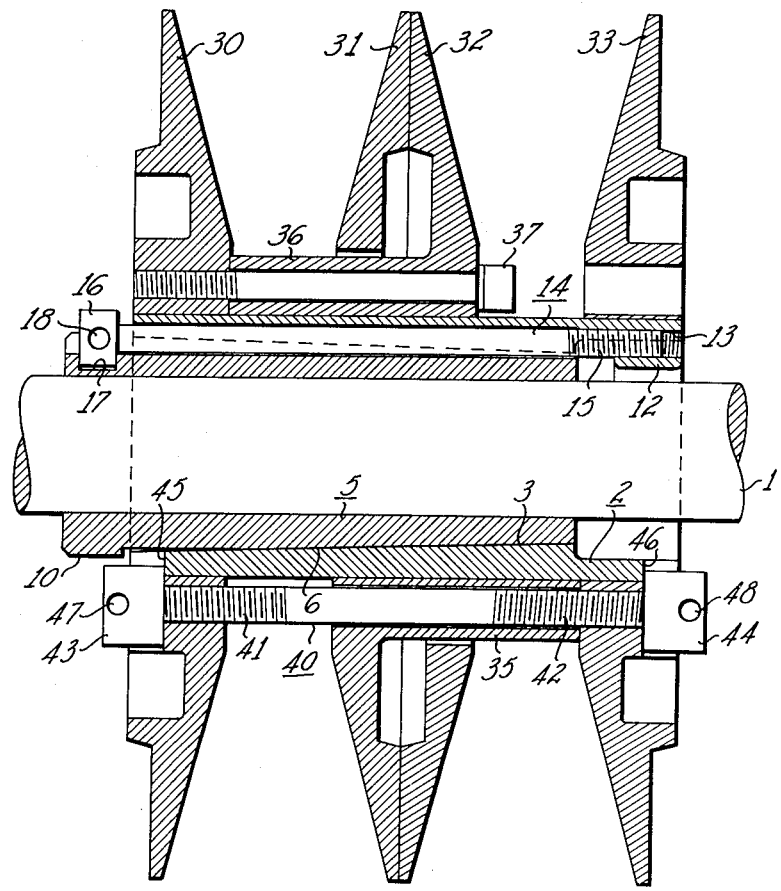
Figure 2:
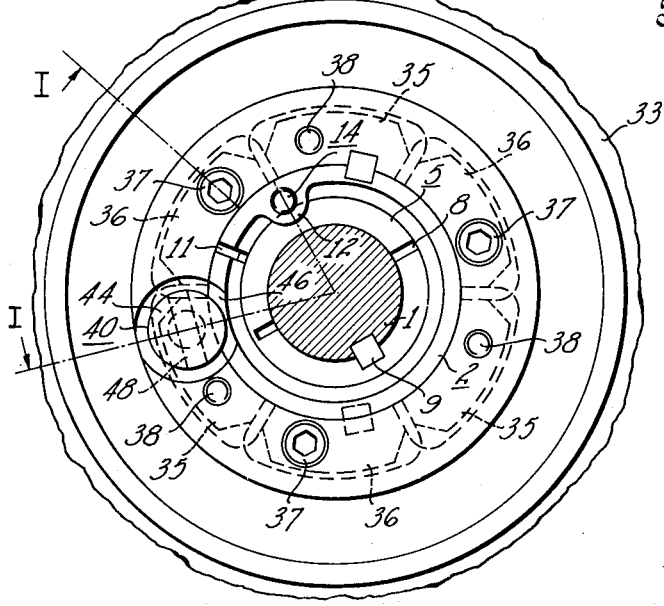

Other objects will appear from the following description and drawing in which:

Fig. 1 is a view of an adjustable diameter multiple groove pulley cooperating with the fastening means of the present invention, shown in section on a longitudinal plane through the axis of rotation taken on line I—I of Fig. 2; and Fig. 2 is an end view pulley assembly shown in Fig. 1, viewed from the right hand side.

In the drawing the fastening device embodying the present invention is shown by way of example as means for securing an adjustable diameter, multiple groove pulley to a shaft 1 which may be either a driven or driving member. It is contemplated, however, that the fastening means may also be utilized for securing wheels of various types and other mechanical members to shafts.

The illustrated fastening means comprises a longitudinally split sleeve member 2 with a tapered bore portion 3, and a longitudinally split bushing 5 with a tapered external surface portion 6 fitting the tapered bore portion of the sleeve member. Sleeve member 2 has a cylindrical external surface for receiving a pulley or the like and bushing 5 has a shaft engaging bore for engagement with shaft 1. Concentrically mounted on sleeve member 2 in slidable nonrotatable relation is a plurality of annularly shaped disks 30, 31, 32 and 33 which are provided with belt engaging surfaces to form a multiple groove pulley. Disks 30 and 32 are clamped together in axially spaced abutting relation to form a unitary set of disks and the alternate disks 31 and 33 are also clamped together in axially spaced abutting relation to form a second unitary set of disks. The two sets of disks are axially movable relative to each other and relative to sleeve member 2 so that the effective pitch diameter of the pulley may be varied.

When the sets of disks are moved to desired axial positions on sleeve member 2, by means described hereinafter, the fastening means functions to clampingly secure the sets of disks to shaft 1. This function is performed when sleeve member 2 is moved axially relative to bushing 5 such that the bushing contracts radially to clampingly engage shaft 1 and the sleeve member expands radially to clampingly engage the sets of disks. Bushing 5 may be formed without the longitudinal split, however, and in that case it would be necessary to fasten the bushing to shaft 1 with set screws or the like.

The present invention is directed primarily to the providing of new and improved means for moving sleeve member 2 axially relative to bushing 5. Bushing 5 is centrally bored for a sliding fit on shaft 1 and is split throughout its length along a radial plane as at 8, the split or cut being of sufficient width to permit bushing 5 to be contracted by clamping to tightly grip shaft 1. The shaft and bushing may be provided with conventional key means indicated at 9 and the external surface of bushing 5 is divided into tapered portion 6 and a shoulder portion 10. Sleeve member 2 is illustrated as being radially expansible by virtue of being split throughout its length along a substantially radial plane as at 11 and is provided with tapered bore portion 3 having the same taper angle as the tapered surface 6 on bushing 5. The largest diameter of tapered bore portion 3 is at one end of sleeve member 2, the left end in Fig. 1, and at the other end of the sleeve member there is defined a lug 12, having a threaded longitudinal bore 13, which extends radially toward the axis of the sleeve member. Lug 12 is spaced a suitable distance from tapered bore portion 3 so that it will not contact bushing 5 when sleeve member 2 is moved axially relative to the bushing. Lug 12 may also be in the form of an annular flange within the scope of the present invention.

A rotatable actuating screw 14, having a threaded section 15 for threaded engagement with threaded bore 13 of lug 12, is provided to effect movement of sleeve member 2 axially relative to bushing 5 to cause the sleeve member to expand radially into clamping engagement with disks 30, 31, 32 and 33. Screw 14 is provided with a head portion 16, which is partially extendable into a slot 17 provided in shoulder portion 10 of bushing 5, to anchor the screw axially relative to the bushing. The portion of screw 14 which extends between slot 17 and threaded bore 13 is disposed in a longitudinally extending hole defined jointly by and between sleeve member 2 and bushing 5. With this arrangement, screw 14 may serve as a driving key. A hole 18 may be provided in the head 16 of screw 14 to receive a rod (not shown) for rotating the screw.

An advantage of the arrangement described hereinabove is that sleeve member 2 may be formed with a relatively small outside diameter in that it is not necessary to increase the radial distance between the inside diameter of bushing 5 and the outside diameter of the sleeve member in order to accommodate screw 14 and lug 12. In other words, the arrangement of screw 14 and lug 12 according to the present invention permits the radial distance referred to above to be as small as the strength requirements for the sleeve member and bushing will allow. It is desirable that the outside diameter of sleeve member 2 be relatively small so that a correspondingly small pitch diameter may be obtained with the disks mounted on the sleeve member. This desired structural arrangement is obtained, according to the invention, by having screw 14 disposed in a hole formed jointly by and between sleeve member 2 and bushing 5, and by having lug 12 positioned axially adjacent the tapered bore portion 6 of the sleeve member so that threaded bore 13 of the lug is in axial and radial alignment with screw 14.

A known way of spacing and clamping the disks 30, 31, 32 and 33 to provide two unitary, relatively movable sets is illustrated in the drawing. Disks 31 and 32 are respectively formed with axially extending lugs 35 and 36 which are circumferentially spaced so that the lugs on each disk form an annular series. Between the respective lugs of disks 31 and 32 are openings such that in assembly the set of lugs on each disk is interdigitated and passes through the openings between the set of lugs on the other disk. Suitable tie bolts 37 and 38 are passed through suitable holes in the lugs and end disk of their sets of disks for clamping together the respective disks in each set.

Means for axially moving the two sets of disks toward and away from each other to increase and decrease the effective pitch diameter of the pulley is illustrated in the drawing. For this purpose there is provided a rotatable actuating screw 40 having reversed or oppositely threaded sections 41 and 42 which are adapted for respective threaded engagement with both sets of disks. Disks 30 and 33 are respectively provided with threaded longitudinal bores which respectively engage the oppositely threaded sections 41 and 42 of screw 40 and a lug 35 of intermediate disk 31 is provided with a suitable opening through which screw 40 passes.

Actuating screw 40 is rotatable in either direction to effect axial movement of the two sets of disks toward and away from each other and means are provided which facilitate rotation of the actuating screw and which maintain the actuating screw in a fixed axial position relative to sleeve member 2. For this purpose there are provided two collar members 43 and 44 which are respectively secured to opposite ends of actuating screw 40 and which respectively abut surface portions 45 and 46 formed on sleeve member 2 at opposite ends thereof. Holes 47 and 48 are provided in collars 43 and 44 so that a rod (not shown) may be inserted in either hole for rotating screw 40 to effect axial movement of the two sets of disks toward and away from each other.

In operation screw 14 may be rotated to unclamp the disks from shaft 1 so that the desired pitch diameter may be obtained by rotatably adjusting actuating screw 40. Screw 14 may then be rotated to clamp the disks to shaft 1 to unite all the parts into a rigid power transmission unit.

The particular embodiment of the invention illustrated and described herein is illustrative only, and the invention includes such other modifications and equivalents as may readily occur to those skilled in the art, within the scope of the appended claims.

It is claimed and desired to secure by Letters Patent:

1. Fastening means for attaching a pulley or the like to a shaft, comprising: a longitudinally split sleeve member having a cylindrical external surface and defining internally thereof a tapered bore having its largest diameter at one end of the sleeve member and defining a lug at the other end of the sleeve member axially adjacent to the tapered bore and extending radially toward the axis of the sleeve member, said lug having a threaded bore extending parallel to the axis of the sleeve member; a longitudinally split bushing having a shaft engaging bore and a tapered external surface fitting the tapered bore of said sleeve member; and a rotatable actuating screw having the shank portion thereof disposed in a longitudinally extending hole defined jointly by and between said bushing and said sleeve member and the end portion thereof threadedly engaging the threaded bore of said lug, said actuating screw being axially fixed relative to said bushing and adapted to be rotated to move said sleeve member axially relative to said bushing to cause said sleeve member to expand radially for clamping engagement with a pulley or the like.

2. Fastening means for attaching a pulley or the like to a shaft, comprising: a longitudinally split sleeve member having a cylindrical external surface and defining internally and at one end thereof a lug extending radially toward the axis of the sleeve member and defining a tapered bore adjacent to the lug and having its largest diameter at the opposite end of the sleeve member, said lug having a threaded bore extending parallel to the axis of the sleeve; a longitudinally split bushing having a shaft engaging bore and a tapered external surface fitting the tapered bore of said sleeve member; and a rotatable actuating screw having the shank portion thereof disposed in a longitudinally extending hole defined jointly by and between said bushing and said sleeve member and the end portion thereof threadedly engaging the threaded bore of said lug, said actuating screw being axially fixed relative to said bushing and adapted to be rotated to move said sleeve member axially relative to said bushing to cause said sleeve member to expand radially for clamping engagement with a pulley or the like.

3. A means for fastening a pulley having a bore therein to a shaft, said means comprising: a longitudinally split bushing having a bore for receiving said shaft and having a tapered external surface; a longitudinally split sleeve having a tapered internal surface fitting said tapered surface of said bushing and an external surface fitting said bore in said pulley, said tapered surfaces of said bushing and of said sleeve having smooth complementary grooves jointly defining a longitudinally extending aperture between said bushing and said sleeve, said sleeve defining a lug positioned axially adjacent the small end of said tapered internal surface, said lug extending radially inward beyond said tapered internal surface and having a longitudinally extending threaded hole therein in longitudinal alignment with said aperture, and a screw extending through said aperture into said threaded hole, said screw having a head partially recessed for rotation in said bushing in a position axially adjacent the large end of said tapered external surface to prevent relative axial movement of said screw and of said bushing and having a threaded portion engaged with said threaded hole in said lug whereby rotation of said screw in a predetermined direction wedges said bushing and said sleeve between said shaft and said pulley.

References Cited in the file of this patent

UNITED STATES PATENTS

| | | |
|---|---|---|
| 525,775 | Wainwright | Sept. 11, 1894 |
| 929,762 | Hess | Aug. 3, 1909 |
| 1,758,182 | Strong | May 13, 1930 |
| 2,402,743 | Firth | June 25, 1946 |
| 2,524,903 | Firth | Oct. 10, 1950 |
| 2,571,699 | Firth | Oct. 16, 1951 |
| 2,610,515 | Williams | Sept. 16, 1952 |